US007883556B1

United States Patent
Wintrell (10) Patent No.: US 7,883,556 B1
(45) Date of Patent: Feb. 8, 2011

(54) DUAL FUEL SLAGGING GASIFIER

(76) Inventor: Reginald Wintrell, 1092 S. Lynnwood Dr., Orem, UT (US) 84097

( * ) Notice: Subject to any disclaimer, the term of this patent is extended or adjusted under 35 U.S.C. 154(b) by 1007 days.

(21) Appl. No.: 11/601,396

(22) Filed: Nov. 17, 2006

(51) Int. Cl.
*C10L 3/00* (2006.01)
(52) U.S. Cl. ................................. 48/197 FM; 48/210
(58) Field of Classification Search ........ 48/62 R–62 A, 48/197 R–197 A, 127.1
See application file for complete search history.

(56) References Cited

U.S. PATENT DOCUMENTS

| 4,144,053 | A | 3/1979 | Kinzer et al. |
| 4,153,426 | A | 5/1979 | Wintrell |
| 4,497,304 | A | 2/1985 | Wintrell et al. |
| 4,581,068 | A | 4/1986 | Schramm |
| 4,600,438 | A | 7/1986 | Harris |
| 6,519,942 | B2 | 2/2003 | Wintrell |
| 2004/0200393 | A1* | 10/2004 | Zauderer ............... 110/345 |
| 2005/0144844 | A1* | 7/2005 | Miyoshi et al. ........... 48/102 R |

FOREIGN PATENT DOCUMENTS

GB    315858    10/1930

* cited by examiner

*Primary Examiner*—Alexa D Neckel
*Assistant Examiner*—Imran Akram
(74) *Attorney, Agent, or Firm*—Thorpe North & Western LLP (57) ABSTRACT

The present invention or dual fuel slagging gasifier provides the equipment, devices, process and methods for increasing the efficiency, commercialization potential and economy of coal/coke gasification. Entrained, fixed bed and water gasification aspects are combined to generate chemically clean high temperature gases from volatile carbonaceous fuels. A charge body of material including particulate solid low volatile carbonaceous material, quartzite, and a flux can be introduced into an upper portion of a slagging gasifier. Further, a finely divided carbonaceous material can be entrained, gasified at a high temperature and injected into a lower portion of the slagging gasifier. This high temperature heat can then be utilized to convert a stack injected steam and the low volatile carbonaceous fuels to additional fuel gas which enhances calorific value and flow rate of the entrained gas to increase energy conversion efficiency of the dual fuel slagging gasifier above that for all known commercial gasifiers.

16 Claims, 4 Drawing Sheets

DUAL FUEL SLAGGING GASIFIER

FIELD OF THE INVENTION

The present invention relates to the commercial production of a substantially chemically clean, desulfurized, hot, dedusted synthetic gas suitable as a commercial replacement for natural gas in power generation. The gas, however, can also be used for industrial or commercial heating, metallurgical reduction processes, chemical synthesis or, following carbon dioxide sequestration, a hydrogen rich fuel with a minimized capacity for "green-house gas" release. The invention relates generally to systems, processes, methods, equipment and devices for optimizing the gasification conversion efficiency of solid or liquid carbonaceous fuels, in particular coals, cokes and heavy oils. Further the invention maximizes or increases the flow rate of off-gas caloric energy by utilizing the high temperature heat generated from entrained gasification to convert steam and low volatile carbonaceous material to additional fuel gas.

BACKGROUND OF THE INVENTION

The U.S. policy to exploit natural gas for clean power generation has created a substantial increase in the cost of power and heating and a concern with the life span of these national reserves. Driving factors for clean power have included public fear of nuclear power generation following the Three Mile Island accident in March 1979 and concern of the power industry with the escalating environmental costs associated with the direct use of coal. Facing present realities, the power industry must now seek a long term alternative to natural gas or a return to nuclear and direct coal fired power generation. For the primary option an alternate gaseous fuel based on our major coal reserves could curtail costs through a time extension on the present investments in installed natural gas power plants. The remaining options, intensive new investments in nuclear and coal fired power plants, do not currently fully address public nuclear fears, government environmental concerns, or the impact of escalating power costs on the U.S. economy. Globally, the present state of coal gasification lacks the commercial ability to rapidly or even effectively replace our dwindling natural gas supplies either at a cost or on a scale necessary to meet the requirements of the United States.

As such, commercial systems and methods which facilitate continuing or increased clean power while controlling costs continue to be sought through ongoing research and development efforts.

SUMMARY OF THE INVENTION

Thus, the philosophy behind the present invention of a dual fuel slagging gasifier is to time drive development through the sequenced use of industrial proven processes and techniques which in operational unison generate commercial volumes of low cost, chemically clean, dedusted, desulfurized, hot, high calorie off gas. A synthetic reducing gas sufficiently high in hydrogen and flame temperature to effectively replace natural gas usage for conventional power generation, industrial processes and a wide variety of synthetic chemicals.

More specifically disclosed is a "dual fuel" sequenced gasification process which uses both volatile and none volatile carbonaceous fuels for the optimized production of a substantially sulfur free, clean synthetic gas. In this sequence of processes, the dual fuel slagging gasifier combines various aspects of an entrained volatile coal gasifier with a fixed bed none volatile coke water gasifier, a slagging blast furnace and a refinery "hot dry" off gas system. In operation of the dual fuel slagging gasifier of the present invention, the initial high temperature entrained gasification of the injected volatile coal or carbonaceous material with oxygen and steam can substantially destroy all condensable hydrocarbons, phenols and tars producing a chemically clean gas of CO, $CO_2$, $H_2$, $H_2O$, $H_2S$ and COS injected into the vertical stack of the gasifier. A sequenced water gas reaction within this stack then recoups the upper level of high temperature heat, as chemical energy, through partial dissociation of injected steam with a none or low volatile descending carbonaceous material such as coke or anthracite. This sequence enriches the calorific value of the entrained gas and provides additional volume to the now ascending gases. Counter-flowing through a descending top charged burden of low volatile carbonaceous material, quartzite and fluxes the ascending gases rapidly cool in progressively supplying the heat for the dissociation reactions and for superheating and fluxing of the burden gangue to liquid slag. The slag in forming and draining through the ascending gas chemically absorbs the burden and inject sulfur prior to hearth pooling then tapping through the slag notch.

A dry hot off gas dedusting and power recovery system can be fitted or retrofit to the upper stack replacing a conventional wet scrubbing venturi permitting a higher temperature off gas and increased efficiency. The higher temperature off gas reduces the requirement for slag cooling material which in turn reduces the level of lower stack heat required to liquefy this slag. This reduction in slag heating permits additional heat for stream dissociation and correspondingly an increased level in ascending and off gas calorific value and flow rate. Following hot dry dedusting the additional recovery of thermal and pressure energy through the power recovery turbine, lost with a wet venturi system, maximizes the overall process efficiency.

In summation the dual fuel gasifier of the present invention sequences conventional proven processes to produce from U.S. coals a clean, desulfurized, off gas. An off gas produced through progressive enrichment in the present invention has an adiabatic flame temperature equivalent to or above that of natural gas. The processes and systems of the present invention are high capacity processes with off gas volumes aligned to those of a conventional blast furnace at 100,000 to 250,000 s.c.f.m. which is a range commercially suited to replace natural gas for power generation or reformed natural gas for the synthetic production of hydrogen. The present invention has the potential for a highly efficient and economical gasification process with calculated energy conversion efficiencies in the 90 percentage range and a truly competitive low off gas operational cost.

In the operational process of the dual fuel slagging gasifier either a new or existing blast furnace-type stack can be charged with sized particles of solid carbonaceous material (normally 1 to 4 inches) such as normal, low grade or undersized metallurgical or furnace coke, anthracite or petroleum coke together with flux materials (normally screened ⅜" and above), such as limestone, dolomite, and high lime steel making slag. In conjunction with conventional top charging, fluent fuels around 200 mesh such as pulverized coal (lignite, sub-bituminous, bituminous, anthracite), coke (metallurgical, foundry or petroleum), plastics, other low volatile carbonaceous materials, or liquid oils or tars are blended, with lime if desired. These materials can then be entrained within a pressurized oxygen/steam mixture and propelled, at speeds above the rate of the flame propagation, into and through entrained gasification chambers positioned to exit within the hearth tuyeres of the gasifier.

The fluent fuel and oxygen ignite, combust and thermochemically react with the steam producing a high temperature chemically clean reducing gas that is driven through the entrained combustion chambers and the tuyeres into the gasifier raceway and upwardly through the descending body of charged material or burden within the gasifier stack. The reaction temperature, typically in the range of 2800° F. to 3800° F., is sufficient to thermally destroy substantially all phenols, tars and condensable hydrocarbons and to ensure the melting ash from the fluent fuel combines with that from the combusted coke and fluxes to provide a liquid hearth slag. Under the reducing conditions and temperature prevailing within the gasifier hearth the descending slag effectively scavenges the released sulfur from the ascending gases.

Above the raceway the high temperature sulfur free ascending gases, generally above 2800° F., provide heat sufficient to chemically react and partially dissociate the stack injected steam within and with the descending hot coke. The reaction, which continues until the ascending gases cool to around 1700° F., generates copious volumes of hydrogen and carbon monoxide increasing the flow rate, calorific value and steam level of the ascending gases.

Following the near cessation of steam dissociation, heat in the ascending gases transfers substantially only to the descending body of charged materials to raise the temperature and to supply the heat required to dissociate the descending fluxes. The quantities of quartzite, flux and slag generating material, top charged with the low volatile carbonaceous material, are calculated based on their material analyses, through heat and material balances, to ensure the slag basicity and volume are sufficient for total sulfur removal and for cooling the top off gas to a temperature within a selected safe operating range. In cooling, the surplus steam and carbon monoxide within the ascending off gases are driven, through the change in gas equilibrium, to a final boost on the level of hydrogen and carbon dioxide. Thus through these sequenced processes the dual fuel slagging gasifier provides a totally sulfur free off gas with high hydrogen and calorific content and an optimized energy conversion efficiency.

The dual fuel hot dry off gas system eliminates the need to use extensive volumes of cooling water. Conventional blast furnaces which use de-volatilized coke and which cool the off gas down to around 200 to 400° F. can do so with moderate quantities of cooling water. This is achievable because the off gas has moisture levels below that for ambient saturation. Thus in cooling blast furnace off gas a portion of the cooling water is evaporated to maintain ambient saturation which in turn extracts a substantial amount of sensible heat from within the off gas. Conversely, in the gasification of volatile coals the off gas has moisture levels normally above that of ambient saturation. These gases, therefore, cannot be cooled by a partial evaporation of the cooling water and in fact require condensation of a portion of the moisture level in the off gas. Thus, the wet scrubbing mechanism for coal derived off gas requires, as against the same volume of coke derived off gas, a substantial, often commercially impractical, several fold increase in cooling water.

The dual fuel slagging gasifier and its dry hot off gas system of the present invention permits an optimized conversion of input to gaseous energy with full sulfur removal from the off gas. Cyclonic or multi-cone dust extraction systems can be designed to tolerate temperatures up to 1400° F. Thus allowing for temperature swings and fluctuations, an acceptable maximum off gas temperature from the dual fuel slagging gasifier process can be around 1200° F. In this way the product synthesis gas can be dedusted at relatively high temperatures without extra cooling. Blast furnace practice has verified that sulfur levels measured in the off gas are negligible as, with the correct operating chemistry, the total charged sulfur essentially partitions between the slag and hot metal. Although basic slags can absorb high sulfur levels of around 5%, normal blast furnace operation seeks to ensure full sulfur removal by operation levels of around 2 to 2.4% sulfur. Thus in the dual fuel slagging gasifier process the off gas temperature is controlled to that associated with an upper operational slag sulfur level of 2.4% or, as a maximum, that required for a safe operation of the equipment in the off gas system.

Figure 4A:
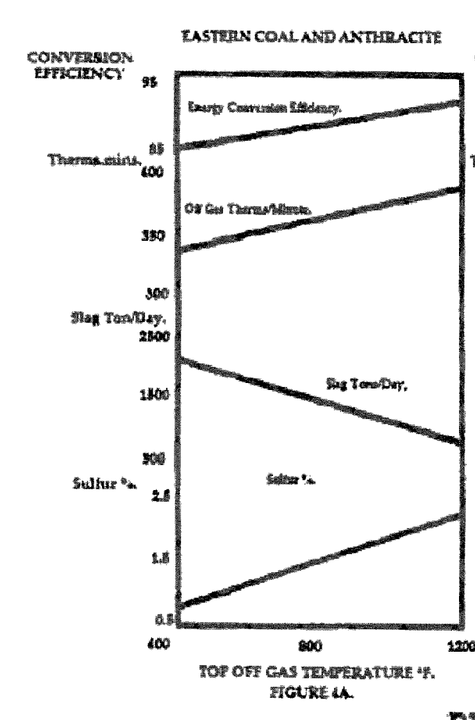
Figure 4B:
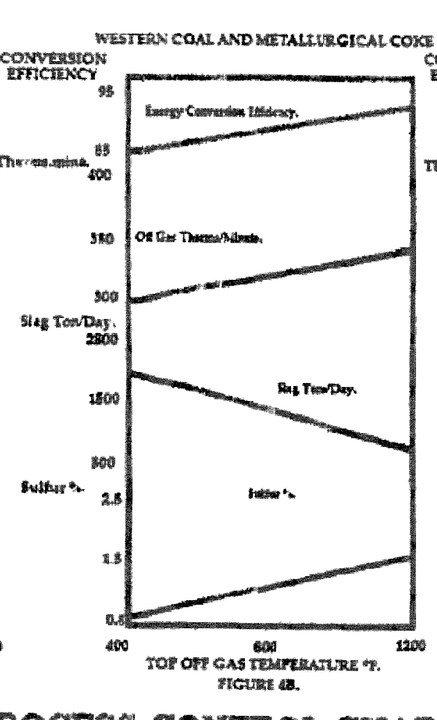

In those cases analyzed within the limits specified above, the dry hot off gas system has verified the off gas temperature and thus the additional sensible heat transferred with the off gas is, for conventional coals, substantially above that, that could be achieved with wet gas scrubbing. For a typical Eastern coal and anthracite or Western coal and metallurgical coke used in the dual fuel slagging gasifier, FIGS. 4A and 4B, respectively, show against off gas temperatures, from 400 to 1200° F. the sulfur levels in the slag, the energy conversion efficiency, and the off gas heating value in therms/minute. Assuming for the safety of the operation we seek to maintain our off gas temperature at 1200° F., FIGS. 4A and B show the sulfur loading within the slag would be 2.3% and 1.9%, respectively, which is essentially just within the upper range of operational blast furnace sulfur/slag levels. At this 1200° F. off gas temperature the increase in gasifier energy conversion efficiency is shown in FIGS. 4A and 4B to be some 8% more than with wet scrubbing i.e. 200 to 400° F.

Figure 5:
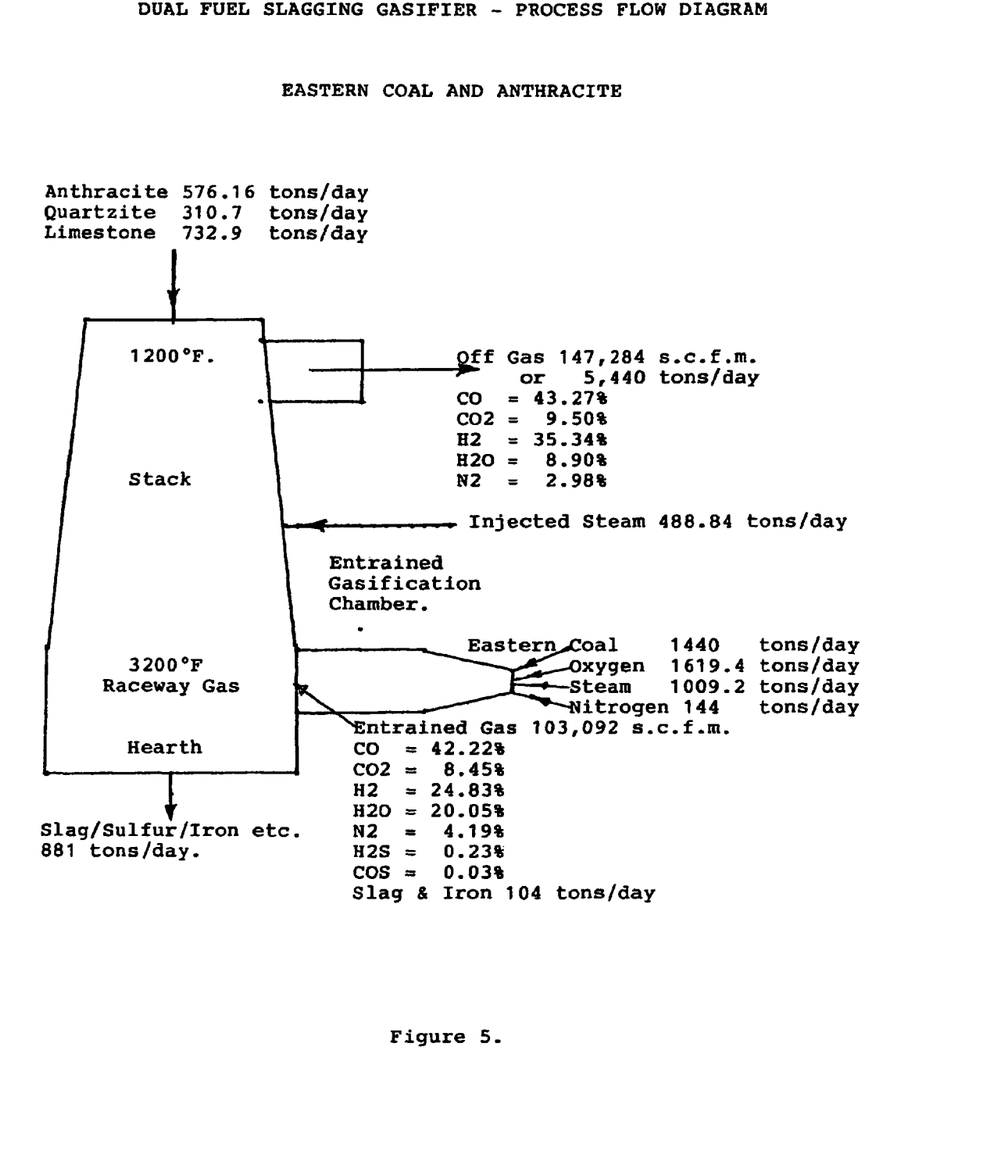
FIG. 5 is a "dual fuel Slagging Gasifier—Process Flow Diagram" based on calculated heat and material balances for a typical entrained U.S. Eastern coal, an injected steam and a charged descending anthracite.

With Eastern coal and anthracite the dual fuel slagging gasifier process can be operationally optimized with a 1200° F. off gas temperature and a slag sulfur percentage of 2.3%. The gasifier would thus essentially operate as shown in FIG. 5. Based on calculated injected materials of 1440 tons of eastern coal, 1619.4 tons of oxygen, 1498 tons of steam, 144 tons of nitrogen and charged materials of 576.1 tons of anthracite, 732.9 tons of limestone and 310.7 tons of quartzite per day, a wet off gas of 147,284 s.c.f.m. can be produced with a calorific value of 263 Btu/s.c.f. and an adiabatic flame temperature of 3889° F. The overall calculated energy conversion factor being 93%, a substantial thermo-chemical achievement. The size of a converted blast furnace required for this operation would have a hearth diameter of around 30 feet. This would be considered a medium sized unit, although other sizes and capacities can also be designed based on specific needs. An estimated cost of the off gas using recent (2005) costing and assuming a $100 million for a retrofit blast furnace conversion cost would be around $3.91 per decatherm or 1 million Btu. Similar figures are calculated when using U.S. Western coal and metallurgical coke.

In the innovative design of the dual fuel slagging gasifier, the stack charging equipment can be thermally protected by insulation below the large bell and through the appropriate quantity of liquid/gaseous cold nitrogen injected between the bells as sequenced with the charging operation. The functions of the liquid/gaseous nitrogen is to maintain the big bell cool at temperatures safely below 900° F., to restrict the hydrogen rich top off gas from egress into and through the bell hopper system and to dilute and cool what off gas does enter to limits below flammability and below the ignition temperature.

The dual fuel slagging gasifier of the present invention has few limits as to commercialization potential. It can use both solid and liquid fuels, it can provide commercial quantities of off gas sufficient even with a moderately sized converted blast furnace to produce and to generate over 300 MW of power. It can because of the off gas cleanliness and high flame temperature rapidly re-supply present power operations when natural gas is no longer available. Additionally, as the desulfurized off gas is high in hydrogen and carbon monoxide content, around 75%, it can readily replace reformed natural gas as a source of hydrogen. Further, with the availability of used blast furnaces, the known reliance of blast furnace technology and a 250 years supply of coal, the dual fuel slagging gasifier process could be rapidly employed in existing available industrial locations throughout the United States with long term confidence. Overall the dual fuel slagging gasifier is a suitable and desirable candidate for a clean low cost natural gas replacement technology.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The following figures and drawings in connection with the disclosure of the preferred embodiment will make apparent the features and advantages of the invention.

FIGS. 4A, 4B, & 4C are graphs of the main calculated parameters, as used in the operational optimization of the dual fuel slagging gasifier. FIG. 4A, shows the associated graphs for injecting a typical Eastern coal with charged anthracite, 4B, a typical Western coal with metallurgical coke and, 4C, a finely divided petroleum coke with a graded lump petroleum coke.

It will be understood that the above figures are provided for purposes of facilitating an understanding of several aspects of the invention and are not intended to be limiting. For example, dimensions and orientations can be varied from those depicted without departing from the scope of the invention. Further, not all components shown are required while optional components may not be shown for the sake of clarity.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus for example, reference to "a gas" includes reference to one or more gases, and reference to "an entrained gasification chamber" includes reference to one or more of such gasification chambers.

As used herein, "entrained gases," "ascending gases," "off gases," and "exit gases" progressively refers to the hot gases which are produced in the Dual fuel slagging gasification process utilizing fuels such as coals, cokes, heavy oils etc. Such gases may have a temperature of from about 200 to 4000° F. and may include such gases as CO, $CO_2$, $H_2$, $H_2O$, $N_2$, $SO_2$, $H_2S$, COS, and such particulates as C, Fe, FeO, $Fe_2O_3$, $Fe_3O_4$, $SiO_2$, $Al_2O_3$, CaO, MgO, and S etc.

As used herein, "heat energy" refers to energy that may be transferred by temperature differential directly from one material to another as heat, without using a chemical reaction to produce the heat energy.

As used herein, "pressure energy" refers to energy that is released during a change in pressure of a material such as a gas from a higher pressure to a lower pressure.

As used herein, "chemical energy" refers to energy that is released by a chemical reaction between two or more materials to produce heat, or another form of energy for transfer. By way of example without limitations, a transfer of chemical energy may be performed by combusting one material to heat another material, and therefore transfer heat energy.

As used herein, "quartzite" refers to materials containing silica. Quartzite can include crushed quartzite rock, quartz, sand, or other materials which contain a sufficiently high concentration of silica to achieve a desirable basicity in the slag.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

Concentrations, amounts, temperatures and other numerical data may be present herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example a temperature range of about 800 to about 3000° F. should be interpreted to include not only the explicitly recited concentration limits of 800 and 3000° F., but also to include individual temperatures such as 900° F., 1000° F., 2000° F., and sub-ranges such as 1000 to 1500° F., 2000 to 2500° F., etc. The same principle applies to ranges reciting only one numerical value, such as "less than about 3000° F.," which should be interpreted to include all of the above recited values and ranges. Further, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

B. The Invention

Figure 1:
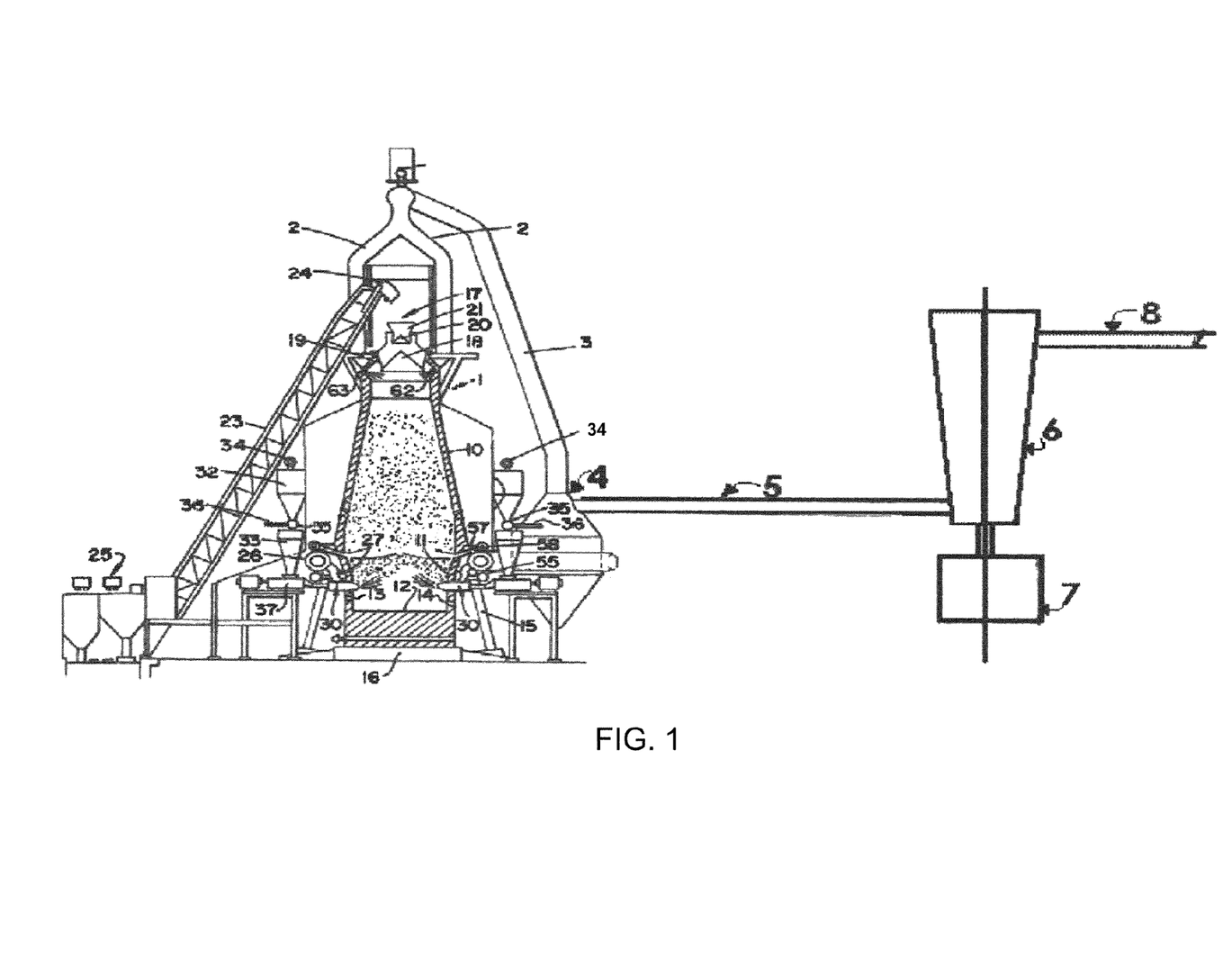
FIG. 1 is a diagrammatic cross sectional elevation showing a vertical or blast furnace type shaft with a conventional skip and with the entrained gasification chambers and steam injection systems respectively installed at and above the furnace hearth. The wet gas scrubbing system, as conventionally used in blast furnace practice, has been replaced on the dual fuel slagging gasifier with a dry scrubbing system which further incorporates a pressure recovery turbine (or back pressure turbine) and coupled generator to control the off gas top pressure and to generate power.

Referring now to the embodiment of the invention shown in FIG. 1, 1 designates a blast furnace or vertical shaft of essentially known construction having at or near a top portion thereof a plurality of gas collecting uptake conduits 2 connected to a downcomer conduit 3 that collects the hot off gas and discharges it into a dry dust extraction system 4 which consists of a cyclone dust extractor and/or an electrostatic dust extraction precipitator. The dust extraction systems consist of conventional modules known to those skilled in the art. If the dust system is a cyclone or multi-cyclone extractor the temperature of the off gas should be maintained below about 1400° F. If the dust extraction system incorporates an electrostatic precipitator then the temperature of the off gas should be maintained below 900° F.

Exiting the dust extraction system, the cleaned gases flow through conduit 5 then through a power recovery expander or back pressure turbine 6. The power recovery expander, also referred to as a back pressure turbine, may be any typical unit known to those skilled in the art, which is capable of sustaining the gasifier top pressure while transferring gaseous pressure energy through its rotating blades to a coupled power generator 7. Essentially, the power recovery expander or back pressure turbine works like a gas driven turbine, which in lowering the off gas pressure expands its volume and subsequently its flow rate. The increased flow, through one or more rotor blades, turns the turbine shaft which coupled to generator 7 rotates and converts the drop in gaseous pressure energy to electric power. The power recovery expander (or back pressure) may be used to control the pressure drop and thus the top off gas pressure by any appropriate logic controller known to those skilled in the art, The off gas exhausting from the expander 6 has a temperature of about 600° F. which combines with the calorific value of the off gases to produce on combustion an enhanced adiabatic flame temperature in the range of 3500° F. to 3900° F. This flame temperature is thus equivalent to or in excess of that of natural gas (3525° F.) which makes the dual fuel reducing off gas, exiting conduit 8, ideally suited for conventional power generation or conventional heating or for high temperature smelting operations. Additionally, with further shifting and purification the dual fuel off gas readily converts to pure hydrogen which can be used as an automobile fuel, for chemical synthesis, or as a means of reducing the release of green house gases.

The dual fuel slagging gasifier 1 comprises a shaft or stack 10 of known construction, the lower portion of which includes a bosh 11, a hearth portion 12 having a slag notch 13, and an iron notch 14, if desired. The stack of the furnace is supported by known support means 15, the hearth portion being supported by known means 16. The upper portion of the stack terminates in known charging means 17, which, as diagrammatically shown in the illustrated embodiment FIG. 1 comprises a large bell 18 and its hopper 19, and small bell 20 and its hopper 21, the bells being adapted to be lowered and raised by known means, not shown, to open and close their respective hoppers for charging purposes in known manner and to minimize loss of gasifier pressure and off gas. The installation includes gasifier feeding means, as illustrated is a conventional blast furnace skip bridge 23 and skip car 24, to supply charge material to the gasifier, conveyers are an alternative, the feeding means being supplied with burden material by known means 25.

In the illustrated apparatus a bustle pipe 26 surrounds the bosh and has connected to it tuyeres 27 that discharge oxygen or oxygen containing gases into the gasifier as described later. The bustle pipe is connected to an oxygen pipe line 28.

Figure 2:
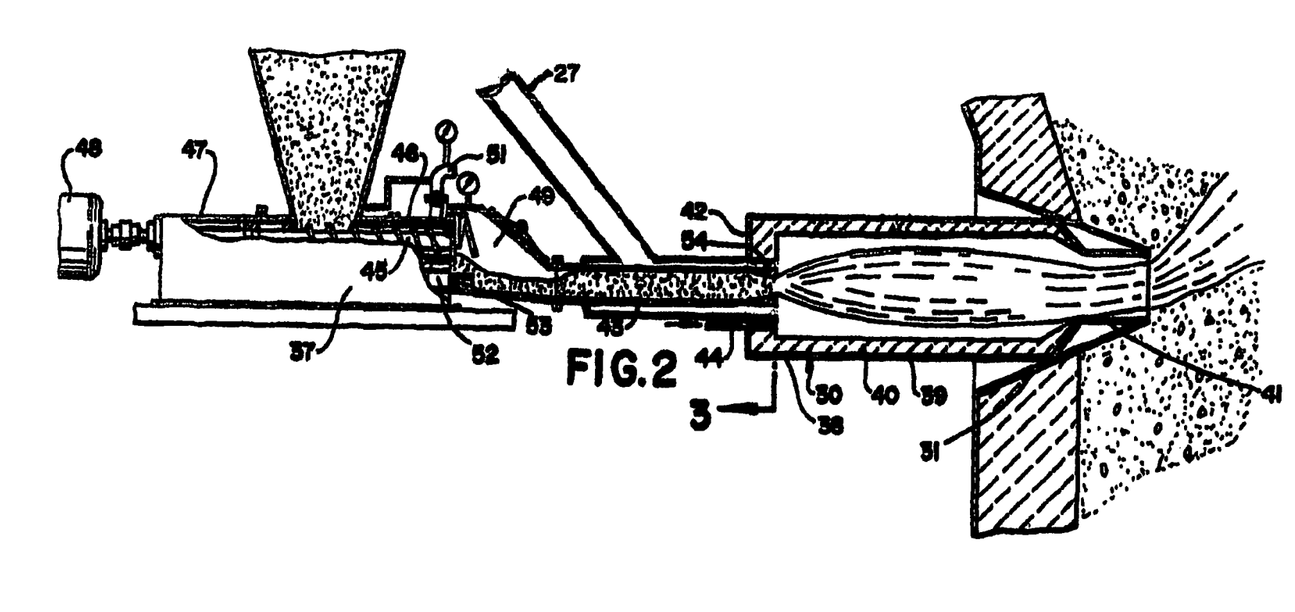
FIG. 2 is a detail to a larger scale showing one of the entrained gasification chambers, in cross section, with one of the possible associated fuel feed means.
Figure 3:
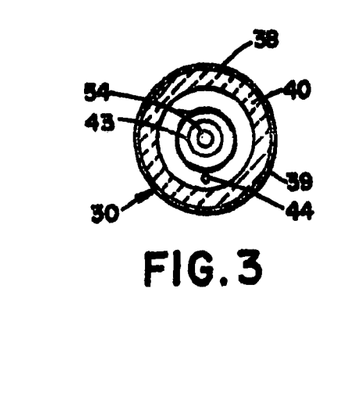
FIG. 3 is a cross sectional view of the entrained gasification chamber along line 3-3 of FIG. 2 and to the same scale.

A plurality of entrained gasification chambers 30 (shown in FIGS. 2 and 3), for gasifying liquid or solid fuels supplied to the chambers, are spaced around the upper portion of the hearth, preferably at equal intervals, to discharge into the gasifier preferably through the tuyere openings 31.

In the illustrated apparatus, moreover, at each entrained gasification chamber 30 there is located a pair of superposed upper and lower hoppers 32 and 33. Fluent finely divided or powdered solid carbonaceous fuel such as comminuted anthracite coal, steam coal, lignite or other suitable coal, or comminuted waste or by-product carbonaceous material such as breeze or under-sized coke, coal char, charcoal, or petroleum coke, can be supplied under appropriate pressure to each hopper 32 from a conduit 34. Finely divided slag forming material such as lime or dolomite may be intermixed with such carbonaceous fuel. Preferably the finely divided material introduced into the hoppers is such that about 70% to 80% of each finely divided constituent will be less than 200 mesh.

Each upper hopper 32 communicates with its associated lower hopper 33 through a suitably known valve 35 which may also be connected to a pipe 36 for supplying suitable gas such as nitrogen or natural gas, under moderate pressure to the lower hopper. The lower end of each lower hopper communicates with feeding means 37 that feeds the finely divided material from each pair of upper and lower hoppers to the interior of the associated entrained gasification chamber, Each pair of hoppers 32 and 33 is operated so that finely divided carbonaceous fuel, possibly intermixed with slag-forming fluxes such as lime or dolomite, is controlled and fed from the lower hopper 33 into its associated entrained gasification chamber 30. As the finely divided fuel in the lower hopper 33 approaches a set low limit, valve 35 is opened and the lower hopper is filled to a set upper limit from the upper hopper, after which the valve is closed and the upper hopper is refilled as required. Suitable known control means with low level alarms are provided to supply the finely divided fuel into the upper then lower hoppers and to ensure, during gasification, an uninterrupted flow of fuel into the entrained gasification chamber 30, As shown in larger scale FIGS. 2 and 3, each entrained gasification chamber 30 in the illustrative embodiment comprises an enclosure 38 of generally elongated cylindrical configuration comprising a steel outer shell 39 that is lined with a suitable known heat resistant refractory material 40 capable of withstanding high flame temperatures, suitable cooling of the enclosure walls can also be provided, if desired. The enclosure has a discharge end 41 of a cross section that fits into a tuyere opening 31 of the dual fuel slagging gasifier stack and is adapted to discharge into the dual fuel slagging gasifier raceway. The enclosure also has an inlet end 42 connected to conduit 43 connected to the feed means 37. A known type of preheating burner 44 is adapted to discharge into the inlet end of the enclosure for preheating and initial ignition purposes. A tuyere 27 for a high purity oxygen/steam mixture also discharges into the enclosure 38. The high purity oxygen can be either cold (e.g. about ambient to 200° F.) or heated (e.g. above 200° F.).

Each feed means 37 is of a known type, illustrated is a Fuller-Kinyon pump although others could be used, comprising a helical vaned conveyer member 45 mounted for rotation about a lateral axis in a barrel portion 46 of a suitable housing 47, and rotated by power means such as electric motor 48. Housing 47 has an upper opening connected to the bottom of one of the lower hoppers 33 which discharges the finely divided carbonaceous fuel and other finely divided material into the barrel portion of the housing in which the vanes of the conveyer member 45 closely fit. As member 45 rotates its vanes convey the material to the discharge portion 49 of the feed means, which is connected gas tight to conduit 43.

Propelling gas, such as steam, air, oxygen, fuel gas, or an inert gas such as nitrogen, supplied from a conduit 51, is discharged through conduit 52 and nozzles 53 into discharge portion 49 and conduit 43 in sufficient volume and at a pressure adequate to entrain the finely divided solid material supplied from conveyer member 45 and discharge it, at a velocity in excess of the speed of flame propagation, through conduit 43 and its nozzle 54 into the associate entrained gasification chamber 30. In such chamber, the finely divided solid carbonaceous fuel is ignited, partially combusted with oxygen and steam to a blast of hot reducing gases and any remaining unburned finely divided particles of carbonaceous material and discharged through tuyeres 31 into the raceway of the dual fuel slagging gasifier.

In the illustrated embodiment, an oxygen line 28 and steam line 55 supply a source of oxygen of substantial purity and a source of low pressure steam to bustle mains 26 and 55 respectively. Tuyere 27 is connected through suitable valving independently to both the oxygen and steam supply and provides the required mixture of oxygen and steam through tuyere 27 to the entrained gasification chamber 30.

Metallurgical, furnace or petroleum coke, anthracite, charred coal, charcoal or any other alternative low volatile solid carbonaceous fuel either mixed or singular charged with quartzite and flux materials such as limestone, dolomite, basic oxygen, QBOP, or open hearth furnace slag is delivered through known conveying means such as the skip hoist system 23, to a bell charging system 17, both as shown, or alternatively through any other conventional delivery or charging system. The charged materials, as required by the rate of burden descent, are delivered through feed hopper 21 by the conventional sequencing of the small bell 20 and large bell 18. To prevent the ingress of high temperature top gas into and through the bell chamber and to maintain the insulated large bell 18 cool, pressurized liquid and/or gaseous cold nitrogen is injected, as required, through system 63.

The combustion ratio of entrained finely divided carbonaceous fuel, high purity oxygen and steam injected into the entrained gasification chamber 30 is adjusted to provide the heat and flame temperature to adequately liquefy the gasifier slag. In the example of FIG. 4A the weight ratio calculated to provide a flame temperature of 3200° F. with a pulverized eastern coal, a 96% purity oxygen and low pressure steam was 1/1.125/0.701. The calculated gas analysis and calorific value, assuming full fuel consumption in the entrained gasification chamber was 42.22% CO, 8.45% $CO_2$, 20.05% $H_2O$, 24.83% $H_2$, 4.19% $N_2$, 0.55% $H_2S$, 0.03% COS and 204 BTU/s.c.f. wet. The energy conversion efficiency within the entrained gasification chamber, i.e. Calorific Energy in Gasx100/Energy Input, was 70.16%. The calculated adiabatic flame temperature and heat rate, assuming this entrained gas could be wet scrubbed to an ambient temperature of around 100° F., would be respectively 3814° F. and 21,426,548 Btu/min. These calculated values are consistent with commercial Koppers-Totzek entrained coal gasification processes.

The energy conversion efficiency for Eastern coal and anthracite, enhanced through the water gas reaction in the stack and by the increased top temperature associated with the dual fuel slagging gasifier dry off gas system, calculated as 93%. This is a substantial increase over all known gasification processes. Associated with these enhancements the effective calorific value of the top off gas increased to a calculated 263 Btu/s.c.f. wet, which includes the sensible heat in the top gas at 1200° F. The flame temperature of this off gas is 3889° F. and the calculated heat rate of the off gas from the dual fuel slagging gasifier is 38,772,186 Btu/min which is an 81% increase over entrained gasification. The dual fuel slagging gasifier generates a substantial increase in the off gas calorific and sensible heat values and in the heat flow rate over other processes which in turn increases the energy conversion efficiency and, on combustion of the off gas, the flame temperature and the heat radiation rate.

The Stefan-Boltzmann law, which is used to calculate the heat radiation rate of gases, states that when a body of area A square feet and having an emissivity, E, is at T1 Absolute (=t+460° F.) and its solid surroundings are at T2 Absolute, the heat radiated, Q, is given by, $$Q=0.173EA[(T1/100)^4-(T2/100)^4]$$

Substituting the wet entrained and then the dual fuel dry off gas flame temperatures of 3814° F. and 3889° F., respectively, in the above formula and assuming T2 as 1000° F. we have Q entrained=569416EA Btu/hour and Q dual fuel=611015EA Btu/hour. For conventional power generation the dual fuel slagging gasifier combusted off gas thus produces a 6.8% increase in the rate of heat radiation over the off gas from an entrained gasification process.

The entrained gasification chambers produce important benefits. If the entrained gasification chambers were not used, and cold finely divided solid fuel should be injected directly through the tuyeres into the dual fuel slagging gasifier, in a manner similar to the conventional blast furnace, this cold fuel would have to compete with the hot coke already in the furnace raceway for the injected oxygen. This would impose a low probability on the chances of the cold coal, as against the hot coke, reacting with any available oxygen. It is for this reason that in a conventional blast furnace operation the highest ratio of injected finely divided coal to charged coke is about one to five.

According to the invention, on the other hand, the flow rates of oxygen, steam and finely divided solid fuel are calculated such that each entrained gasification chamber can ignite, gasify and adequately heat the products of combustion which exit as reducing gas into the gasifier raceway. As the size consist of any 'as yet' unburned finely divided fuel is around 200 mesh or less, its temperature is essentially equal to that of the reducing raceway gas which is some several 100 degrees above the temperature of the carbonaceous material descending into the gasifier raceway. Thus competitively any unburned fuel by temperature and by size advantage will be first consumed within the raceway, by any available oxygen or steam, in preference to the cooler larger sized carbonaceous material. Consequently, by use of the entrained gasification chamber, the ratio of finely divided solid carbonaceous fuel to charged coke or other none or low volatile charged materials can be substantially increased over that achieved in a conventional blast furnace practice. For the dual fuel slagging gasifier process the ratio of entrained to charged carbonaceous material will be required to increase to a value between 3 and 4 to 1.

Since the heat of combustion of the injected finely divided carbonaceous material is required to melt and slag the gasifier gangue, ash and fluxes the gasifier tuyere zone or raceway temperature will require to be maintained at essentially the same temperature range as for conventional blast furnace operations i.e. 3000 to 3800° F. Such temperature levels assure the substantially complete dissociation of ammonia, phenols, tars, and other condensable hydrocarbons pyrolized from within the entrained finely divided volatile coal or other carbonaceous materials.

Thus as the charged carbonaceous material which descends down the furnace stack is none or low volatile the ascending gases will be essentially free of ammonia, phenols, tars, and other condensable hydrocarbons. Additionally as the fluxes descend and liquefy intimately contacting the ascending reducing gas, sulfur will be removed in the hearth and in the stack in the same known manner as occurs in the ironmaking blast furnace operation. The off gas exiting the furnace stack will thus be void of environmental undesirables and, following dry scrubbing, will effectively replace natural gas as a clean high energy, high flame temperature fuel gas.

Figure 4C:
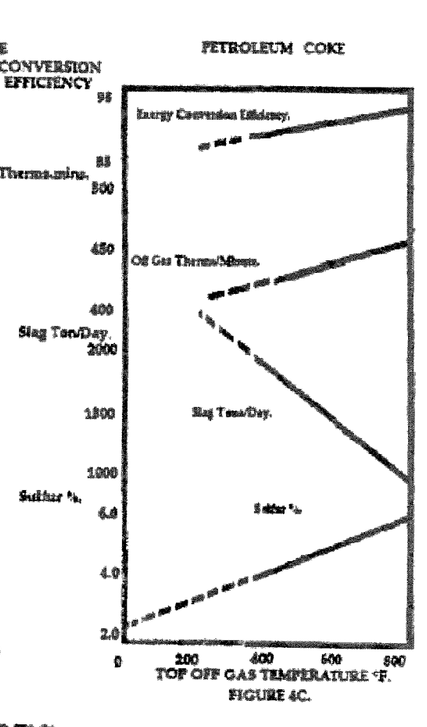

The hot pressurized gases exiting from the entrained gasification chambers through the tuyeres into the dual fuel gasifier raceway are calculated in FIGS. 4A, 4B and 4C to be at a temperature of 3200° F. Leaving the raceway, these gases ascend upwardly permeating through the body of the cooler slowly descending charged materials. In the illustrative embodiment, at a distance above the hearth where the gaseous temperature in the gasifier is between about 2800 and 3100° F., steam is injected through nozzles 57, disposed around the stack, from conduit 58, depending on the raceway temperature, the steam can be discharged into the dual fuel slagging gasifier at a shaft location where the ascending gas temperature is between about 2600° F. and 3600° F.

The steam reacts with the ascending gases and the descending carbon in the body of charged material, in a manner, similar to that in the steam injection phase of the known "water gas" gasification process. The reaction utilizes the high temperature heat in the ascending gases and carbon in the descending burden to dissociate the steam and generate, in accordance with a drive to equilibrium, a copious volumes of hydrogen, carbon monoxide and carbon dioxide. The amount of injected steam is calculated or assessed to be in excess of that required during dissociation to cool the gases to around 1700° F. Although research has shown that steam dissociation is essentially completed between 1500 and 1700° F., the excess steam is to ensure an optimum level of dissociation is achieved both in the stack and in the subsequent cooling of the off gas.

The top off gas in U.S. Pat. No. 4,153,426, in accordance with conventional blast furnace practice, was required to be cooled to between 200-400° F. prior to water scrubbing. The controlled cooling and carburetion of the ascending gases, leaving the water gas steam dissociation zone, in U.S. Pat. No. 4,153,426 was to be accomplished through the injection of liquid carbonaceous material. The concern with this form of cooling, specifically at low temperatures between 1700 to 200° F. is that such temperatures do not thermally destroy all tars, phenols or condensable hydrocarbons and recent investigations into water gas carburetion showed the injection of liquid fuels into the descending burden pack was essentially unsuccessful as a carburetion means. In addition, prior to reaching full temperature equilibrium, the off gas from coal gasification, contains high levels of water vapor which calculate in the range of 8 to 10%. At this water vapor level wet scrubbing, which must cool the gas down to near ambient around 90-100° F. i.e. moisture saturation 6 to 7%, must be by condensation and sensible heat exchange and not, as is normal in a devolatilized coke charged blast furnace operation, where the off gas has a moisture level of 2 to 4%, by evaporation and sensible heat exchange. Thus the high moisture level off gas from any medium or high volatile coal gasifier would require, in comparison to the equivalent volume of off gas from a coke charge conventional blast furnace, a substantial increase, by several fold, in the required volume of cooling water. Such an increase could well be impractical. A final concern with off gas wet scrubbing in U.S. Pat. No. 4,153,926 is it powers the off gas pressure and removes the off gas sensible heat which is counter productive to optimizing process economics.

The dual fuel slagging gasifier with its innovative dry off gas system was thus to eliminate all the above concerns with wet scrubbing. Calculations for injected U.S. Western coal, Eastern coal and petroleum coke using respectively charged metallurgical coke, anthracite and petroleum coke verified that the quantity of quartzite and its associated flux, as required to form the slag volume and basicity to retain the total sulfur, also effectively cooled the top off gas to safe temperatures below the maximum of 1400° F. specified for the cyclonic dust extraction equipment. The innovative dry off gas system thus permits, over conventional wet scrubbing, optimized steam dissociation and full sulfur removal with the maximum permissible off gas temperature and pressure.

All the verifying calculations clearly showed the energy conversion efficiency of the gasifier, i.e. energy in the off gasx100/total energy input into the gasifier (see FIGS. 4A, 4B, and 4C), increased with increasing off gas temperature. The practical limitation with the off gas temperature was ensuring the quartzite and associated flux additions effectively removed the sulfur even if such requirements cooled the off gas below the maximum safe temperature imposed by the dry off gas system vendors. For the graphs shown in FIGS. 4 A to C, the practical limitation, based on conventional blast furnace practice, was that the slag sulfur should be below to 2.4% while the maximum safe off gas temperature, within the bounds of a cyclonic dust extraction system and the bounds of general blast furnace temperature fluctuations should be 1200° F. or below. However, in cases where the slag sulfur level is required to be increased above 2.4% this may be achieved by increasing the slag basicity ratio and/or increasing the gasifier raceway temperature. The practical operational level of 2.4% slag sulfur was derived from a histogram of conventional blast furnace operating practice and, although used as a conservative level for the verified process calculations, is not necessarily considered as the operational maximum. Further, volumes of injected quartzite and flux can be controlled sufficient to achieve a slag basicity from about 0.85 to about 1.25.

Within the above assessed limitation, calculations indicate a dual fuel slagging gasifier, operating with injected Western coal and charged metallurgical coke could, with the appropriate charge of quartzite and flux, maintain a 1.91% sulfur in the slag and a 1200° F. off gas temperature, similarly with injected Eastern coal and charged anthracite, a 2.3% sulfur in the slag and a 1200° F. off gas temperature. Conversely, an operation with both injected and charged high sulfur petroleum coke showed that the top charged quartzite and additional flux required to maintain the slag sulfur at 2.4% would in descent cool the off gas down to around 250° F.

In the illustrative apparatus the off gas exiting the gasifier is cooled, when subjected to high temperature fluctuation, by water sprays 62 which are provided by suitable known means below the big bell. The off gas is then collected through the uptake conduits 2 from whence it flows through conduit 3 into the cyclonic and/or electrostatic precipitator dry dedusting system 4. Following an effective removal of entrained dust the off gas flows through conduit 5 into the power recover expander or back pressure turbine 6, where, subjected to a controlled pressure drop the gas expands. This expansion of the off gas, through the expander or turbine blades, rotates the blade shaft which coupled to the shaft of the generator 7 powers the output of electricity.

The off gas, still at temperature, can then be utilized as a fuel gas for conventional power generation and high temperature processes or as a reducing gas for the reduction of metal oxides or alternatively the high level hydrogen off gas can be readily shifted and converted to high purity hydrogen. The carbon dioxide either shifted by the surplus steam within the off gas or as further concentrated during a total shift to hydrogen can, as such, be sequestered. Converted to hydrogen the off gas can be economically transported through pipelines and used in known synthetic processes for ammonia, natural gas or gasoline production or used as a prime environmental fuel for power generation or an alternative fuel for automobile engines.

Various modifications may be made in the method and apparatus disclosed above as embodying the invention. Thus although new dual fuel slagging gasifiers can be designed and constructed, other types of shaft furnaces, preferably large volume furnaces, and preferably existing furnaces such as blast furnaces and cupolas, could be used, if modified, to carry out the process of the invention.

Alternative types of solid, or liquid, or carbonaceous fuels other than those mentioned above may be used for the dual fuel slagging gasifier. Those indicated, however, generally have economic or practical advantage while some of the waste or by-products that may be considered involve disposition costs. Other types of flux materials may be used, although basic flux materials such as those disclosed, are preferably known to remove sulfur from the furnaces gas and to effectively form a liquid slag with the quartzite and gangue content of the coal and coke ash.

Shaft furnace apparatus embodying the features of the present invention may also advantageously be used for purposes other than gasifiers. Thus in shaft furnaces in which it is desirable to inject fuel into the lower part of the furnace, such as blast furnaces or cupolas, the use of the entrained gasification chamber means, preferably involving the use of several entrained gasification chambers spaced around the furnace, can be very advantageous in making possible an increased level of injection of finely divided solid carbonaceous or liquid carbonaceous fuel material which may be comminuted under-sized coal or breeze coke or other material that would otherwise be waste material but which has substantial fuel value.

The apparatus illustrated as embodying the invention may be modified in various manners without departing from the invention. This includes, other than those illustrated, the various types of known means for injecting or charging solid or liquid fuels, fluxes, quartzite, oxygen, steam or other materials into furnaces or gasifiers.

While the invention has been disclosed with respect to the specific embodiments of the process and apparatus, this is intended for the purpose of illustration rather than limitation; other variations and modifications of the specific embodiments, herein shown and described, will be apparent to those skilled in the art, including, but not limited to, variations in size, materials, shape, form, function and manner of operation, assembly and use may be made within the intended spirit and scope of the invention. Accordingly, the patent is not to be limited to the specific embodiments herein disclosed nor in any way that is inconsistent with the extent to which the progress of the art has been advanced by the invention.

What is claimed is:

1. A method of manufacturing synthetic gas containing hydrogen and carbon monoxide using a dual fuel slagging gasifier, comprising the steps of:
    a) introducing an operational charge material through a top charging system of said gasifier, said charge material comprising particulate solid carbonaceous material, quartzite, and flux to form a body of said charge material descending and reacting in a central shaft of said gasifier;
    b) entraining, injecting, igniting and gasifying a finely divided solid carbonaceous material and natural gas with a pressurized oxygen gas and steam through entrained gasification chambers into a lower portion of said gasifier to form high temperature products of gasification and unburned finely divided carbonaceous material at a temperature sufficiently high to melt, liquefy and slag with the descending charge material to react with either oxygen or steam within the central shaft and to produce a high temperature ascending gas that ascends upwardly through said body of charged material; and
    c) injecting excess steam into said body of descending charged material at an elevated location above the level of entrained material injection, where the ascending gas has a temperature which is sufficient to sustain an endothermic reaction between said excess steam, ascending gas, and carbon in the carbonaceous material to form additional hydrogen, carbon monoxide, and with surplus steam, said surplus steam sufficient to progressively shift the ascending gas to form additional hydrogen and carbon dioxide while said operational charged material descending, heating and reacting provides controlled cooling of the ascending gas, in conjunction with the excess steam, to a temperature which is within a safe operating temperature of the top charging system, to form a high temperature synthesis gas, wherein the charge material has a slag volume sufficient to chemically combine in the central shaft with sulfur or sulfur gases released in the central shaft such that the high temperature synthesis gas is free of sulfur.

2. The method of claim 1, wherein the dual fuel slagging gasifier is a top charged shaft furnace, having a hearth in the lower portion thereof, and entrained gasification system integral with the hearth and a shaft above the hearth and a dry hot off gas dedusting system.

3. The method of claim 1, wherein the particulate solid carbonaceous material or blend of carbonaceous materials has low volatiles or is substantially free of volatiles.

4. The method of claim 1, wherein the flux comprises a limestone, dolomite, or combination thereof.

5. The method of claim 1, further comprising generating electrical power by utilizing both pressure and temperature within the high temperature synthesis gas to generate electrical power by expanding the gas through blades of a power recovery expander coupled to a generator.

6. The method of claim 1, wherein the flux includes dolomite.

7. The method of claim 1, wherein said high temperature products of gasification and unburned finely divided carbonaceous material are discharged into said dual fuel slagging gasifier from an entrained gasification chamber at a temperature sufficient to melt the descending material.

8. The method of claim 1, wherein said excess steam is injected into said dual fuel slagging gasifier and partially dissociated with carbon in said body of charged materials and with the ascending gas to control cool the ascending gas to a temperature between about 1500° F. and about 1800° F.

9. The method of claim 1, wherein said charge material has a composition sufficient to result in a sulfur level in the slag at or below 2.4% and a maximum synthesis gas temperature at or below 1200° F.

10. The method of claim 1, wherein quantities of said quartzite and associated flux material and the temperature within said dual fuel slagging gasifier are controlled, in accordance with the total body of charged and injected materials, to cause the formation in said gasifier of liquid slag that drains and collects as a molten pool in a hearth of the gasifier in the lower portion.

11. The method of claim 10, further comprising controlling the charged weight of the quartzite and flux sufficient to achieve a fluid slag with a basicity from about 0.85 to about 1.25.

12. The method of claim 1, wherein the particulate solid carbonaceous material comprises a member selected from the group consisting of charcoal, anthracite, charred coal or other low volatile carbonaceous materials or any combination of these members.

13. The method of claim 1, wherein said finely divided solid carbonaceous material is selected from the group consisting of sub-bituminous coal, bituminous coal, and any combination of these materials.

14. The method of claim 1, wherein the surplus steam progressively reacts, in association with a water gas equilibrium change and cooling of ascending and outflowing off gas, to enhance the levels of hydrogen and carbon dioxide in the high temperature synthesis gas.

15. The method of claim 1, wherein the dual fuel slagging gasifier is a retrofit blast furnace wherein the method further comprises removing an existing wet scrubbing de-dusting system and installing a dry de-dusting system.

16. The method of claim 1, wherein a ratio of the entrained finely divided solid carbonaceous material to the charged particulate solid carbonaceous material is above 3 to 1.

* * * * *